United States Patent
Tsurumi et al.

(10) Patent No.: US 7,070,533 B2
(45) Date of Patent: *Jul. 4, 2006

(54) INTERNAL TEETH OSCILLATION TYPE INNER GEARING PLANETARY GEAR SYSTEM

(75) Inventors: Yo Tsurumi, Chiryu (JP); Takashi Haga, Ohbu (JP)

(73) Assignee: Sumito Heavy Industries, Ltd., Tokyo (JP)

(*) Notice: Subject to any disclaimer, the term of this patent is extended or adjusted under 35 U.S.C. 154(b) by 44 days.

This patent is subject to a terminal disclaimer.

(21) Appl. No.: 10/809,713

(22) Filed: Mar. 26, 2004

(65) Prior Publication Data
US 2004/0192486 A1 Sep. 30, 2004

(30) Foreign Application Priority Data
Mar. 28, 2003 (JP) ............................. 2003-090065

(51) Int. Cl.
*F16H 1/32* (2006.01)
(52) U.S. Cl. .................. 475/168; 475/162; 475/178
(58) Field of Classification Search ................ 475/168, 475/178, 162
See application file for complete search history.

(56) References Cited

U.S. PATENT DOCUMENTS

| | | | | | |
|---|---|---|---|---|---|
| 4,426,064 | A | * | 1/1984 | Healy | 254/342 |
| 5,606,235 | A | * | 2/1997 | Mauletti | 318/625 |
| 6,699,152 | B1 | * | 3/2004 | Tanaka | 475/149 |
| 2002/0155915 | A1 | * | 10/2002 | Tanaka | 475/162 |
| 2004/0185981 | A1 | * | 9/2004 | Tsurumi et al. | 475/162 |
| 2004/0254042 | A1 | * | 12/2004 | Tsurumi | 475/163 |

FOREIGN PATENT DOCUMENTS

| | | | |
|---|---|---|---|
| JP | 2607937 | | 2/1997 |
| JP | 2000-065158 | | 3/2000 |
| JP | 2000065159 | A * | 3/2000 |
| JP | 2002-364717 | | 12/2002 |

* cited by examiner

*Primary Examiner*—Dirk Wright
*Assistant Examiner*—David D. Le
(74) *Attorney, Agent, or Firm*—Squire, Sanders & Dempsey LLP

(57) ABSTRACT

An internal teeth oscillating inner gearing planetary gear system, wherein installation space for piping, wiring, etc. can be easily secured in the central portion of the system according to a particular application. The gear system is configured such that rotation of an input shaft is reduced by internal teeth oscillating bodies oscillatingly rotating with respect to an external gear. Eccentric shafts are plurally provided. Eccentric shaft gears are provided for the plurality of eccentric shafts, respectively. A transmitting external gear with which the eccentric shaft gears and a driving source-end pinion concurrently mesh is also provided.

8 Claims, 6 Drawing Sheets

INTERNAL TEETH OSCILLATION TYPE INNER GEARING PLANETARY GEAR SYSTEM

BACKGROUND OF THE INVENTION

1. Field of the Invention

The present invention relates to an internal teeth oscillating inner gearing planetary gear system.

2. Description of the Related Art

Conventional inner gearing planetary gear systems are found widely in various areas where reducers are used, owing to the advantages of large torque transmission capability and large reduction ratios being obtainable.

Among such devices, internal teeth oscillating-type inner gearing planetary gear systems are known wherein rotation of an input shaft is reduced and delivered from an output member through oscillatingly rotating internal teeth oscillating bodies around an external gear, the internal teeth oscillating body having a slight difference in the number of teeth with the external gear (for example, Japanese Patent No. 2607937).

An example of the same gear system will now be explained using FIGS. 4 and 5.

In the drawings, a casing 1 has a first support block 1A and a second support block 1B joined together by insertion of an engaging member such as bolts or pins (not shown) into engaging holes 2. A pinion 6 is disposed on the end of an input shaft 5, and the pinion 6 meshes with a plurality of eccentric shaft gears (eccentric shaft driving gear or transmitting gear) 7 disposed at equal angles around the input shaft 5.

In the casing 1, three eccentric shafts 10 are disposed circumferentially at equal-angled intervals (120 degree intervals). The eccentric shafts 10 are supported to be freely rotatable at both axial ends by bearings 8 and 9, and have eccentric bodies 10A and 10B which are in an axially midway portion thereof. The eccentric shaft gears 7 are joined to respective end portions of the eccentric shafts 10. The eccentric shaft gears 7 are rotated by the rotation of the input shaft 5, to rotate each of the eccentric shafts 10.

The eccentric shafts 10 pass through eccentric holes 11A and 11B of two internal teeth oscillating bodies 12A and 12B contained in the casing 1, respectively. Rollers 14A and 14B are disposed between outer circumferences of the two eccentric bodies 10A and 10B adjoined in the axial direction of the eccentric shafts 10 and inner circumferences of the through eccentric holes 11A and 11B of the internal teeth oscillating bodies 12A and 12B, respectively.

An external gear 21 integrated with the end of an output shaft 20 is disposed at the central portion inside the casing 1. Internal teeth 13 formed from pins of the internal teeth oscillating bodies 12A and 12B mesh with external teeth 23 of the external gear 21. A difference in the number of teeth between the external teeth 23 of the external gear 21 and the internal teeth 13 of the internal teeth oscillating bodies 12A and 12B is set to be slight (for example, in a range of about 1 to 4).

The gear system operates in the following manner.

Rotation of the input shaft 5 is delivered to the eccentric shaft gears 7 through the pinion 6. The eccentric shafts 10 are then rotated by the eccentric shaft gears 7. The eccentric bodies 10A and 10B rotate due to rotation of the eccentric shafts 10, then, the internal teeth oscillating bodies 12A and 12B oscillatingly rotate due to the rotation of the eccentric bodies 10A and 10B. Since rotation of the internal teeth oscillating bodies 12A and 12B is restricted, through one rotation of the oscillating rotation of the internal teeth oscillating bodies 12A and 12B, a phase of the external gear 21 which meshes with the internal teeth oscillating bodies 12A and 12B is shifted by the difference in the number of teeth. Thus, a rotation component equivalent to the phase difference becomes the (reduction) rotation of the external gear 21, and reduced rotation is delivered from the output shaft 20.

However, with this variety of internal teeth oscillating-type inner gearing planetary gear system, eccentric shafts for oscillating internal teeth oscillating bodies do not necessarily need to be located at equal intervals circumferentially, nor do all eccentric shafts need to be directly driven. A portion thereof may be driven by following rotation of another component. FIG. 6 shows an example of a construction in which a non-driven eccentric shaft 50A is included and in which each of eccentric shafts 50A through 50C are located circumferentially at non-equal intervals. As another example, a construction is shown in FIG. 7 in which an internal teeth oscillating body 62 is oscillatingly driven by only two eccentric shafts 60A and 60B. These examples are disclosed in Japanese Patent Laid-Open Publication No. 2000-65158.

However, with the gear system disclosed in the former patent publication, because of the three eccentric shaft gears i being located circumferentially at equal intervals are driven by the single (pinion 6 of the) input shaft 5, the input shaft is located coaxially with the output shaft, and thus there was difficulty in creating a design having a hollow shaft passing through the entire gear system. For example, for use as a gear system for joint drives in industrial robots, as a gear system for driving precision machinery, etc., there is often a desire to pass wire harnesses, cooling water piping, etc. through a gear system to a partnered apparatus (driven machine). In such an instance, it meant that designing a driving source such as a motor connected to the input shaft a through-hole was also necessary to design an input shaft with a through-hole. In effect it was nearly impossible to form a large hollow shaft. Further, even if a hollow shaft were to be adopted, a space would be formed inside an input shaft rotating at high speed. It would thus be necessary to install protective piping which would be held so as not to rotate by separate bearings dispsed between the protective piping itself and the inner circumference of the input shaft in order to locate, for example, wire harnesses and cooling water piping in the space. In this respect as well it would be difficult to secure a large enough space, and there would also be cost increases.

In regard to this matter, if a structure is adopted wherein eccentric shafts are located at non-equal intervals in the circumferential direction as described in the latter patent publication, a larger diameter hollow shaft can be formed since an input shaft does not necessarily need to be located coaxially with an output shaft. However, when internal teeth oscillating bodies are driven by a structure wherein the eccentric shafts are located circumferentially at non-equal intervals, a practical problem was encountered in that it was difficult to smoothly oscillate the internal teeth oscillating bodies in a well-balanced manner around the external gear in devices manufactured through a normal manufacturing process. It was therefore necessary to process and assemble each member with especially high precision.

SUMMARY OF THE INVENTION

The present invention is devised to solve this problem. It is an object of the present invention to provide an internal teeth oscillating inner gearing planetary gear system wherein a space for locating piping, wiring, etc. in the central portion of a system can be easily secured according to a particular application, and wherein further smoothness of power transmission can be achieved.

The present invention provides an internal teeth oscillating inner gearing planetary gear system which has an external gear and an internal gear having a slight difference in the number of teeth with the external gear, and eccentric shafts for oscillatingly rotating the internal gear. The internal gear is oscillatingly rotated around the external gear through eccentric bodies located on the eccentric shafts. The gear system comprises a plurality of the eccentric shafts provided parallel to an axis of the external gear, eccentric shaft gears incorporated on the plurality of eccentric shafts, respectively, and a transmitting external gear meshing concurrently with the eccentric shaft gears and a driving source-end pinion. The gear system is configured such that rotation of the driving source-end pinion is transmitted concurrently to the plurality of eccentric shaft gears through the transmitting external gear. Thereby the above-mentioned problems are solved. Further, "slight difference in the number of teeth" herein refers to a difference in the number of teeth within a range of 1 to 6.

According to the present invention, the axis of the driving source-end pinion can be offset to a position radially outward of the transmitting external gear. Thus, as a result, the axis of an input shaft (or an output shaft of a driving source) can be removed from the axis of an output shaft. A large diameter hollow shaft can thus be easily formed in an output shaft. Particularly, rotation speed of an inner wall existing in the space formed in the central portion of the gear system can be made very slow. Therefore, a larger space can be secured at lower cost.

Since all the eccentric shafts can then be "driven equally", internal teeth oscillating bodies can be oscillatingly driven smoothly in a well-balanced manner.

Further, it may be more preferable to adopt a structure wherein the transmitting external gear is formed in a ring shape, and is rotatably supported by an outer circumference of any one of the external gear and the output shaft. Thus, even in the instance of a large diameter hollow shaft being formed, the transmitting external gear can be easily incorporated in the system without hindrance.

In this instance, external teeth of the external gear may be formed by external pins inserted to be freely rotatable in circular grooves thereof, and the external pins may be configured to serve as rollers of bearings of the transmitting external gear. Thereby, reduction of the number of components and shortening of the radial dimension will be made possible.

Also, when the internal teeth oscillating bodies are incorporated axially in a number of two or more, the transmitting external gear may be located between any two internal teeth oscillating bodies thereof. thus, the transmitting external gear can be made to serve a function as a so-called "insert ring" for restricting axial movement of the two internal teeth oscillating bodies.

Further, according to the present invention, since all the eccentric shafts are equally driven, the eccentric shafts do not necessarily need to be located circumferentially at equal intervals. However, the eccentric shafts may be preferably located circumferentially at equal intervals. Thus, even smoother driving of the internal teeth oscillating bodies will be made possible.

Also, how the transmitting external gear is driven specifically is not limited in particular according to the present invention. As regards this, for example, a structure may be adopted wherein a middle shaft, on which the driving source-end pinion is incorporated, is provided parallel to the output shaft and at a position radially outward of the internal teeth oscillating bodies. By rotatingly driving the middle shaft, the transmitting external gear can be driven through the driving source-end pinion. Alternatively, a structure may be adopted wherein a pinion incorporated on an input shaft directly meshes with and drives the transmitting external gear as the driving source-end pinion.

DETAILED DESCRIPTION OF THE PREFERRED EMBODIMENTS

An embodiment of the present invention will now be described with reference to the drawings.

Figure 1:
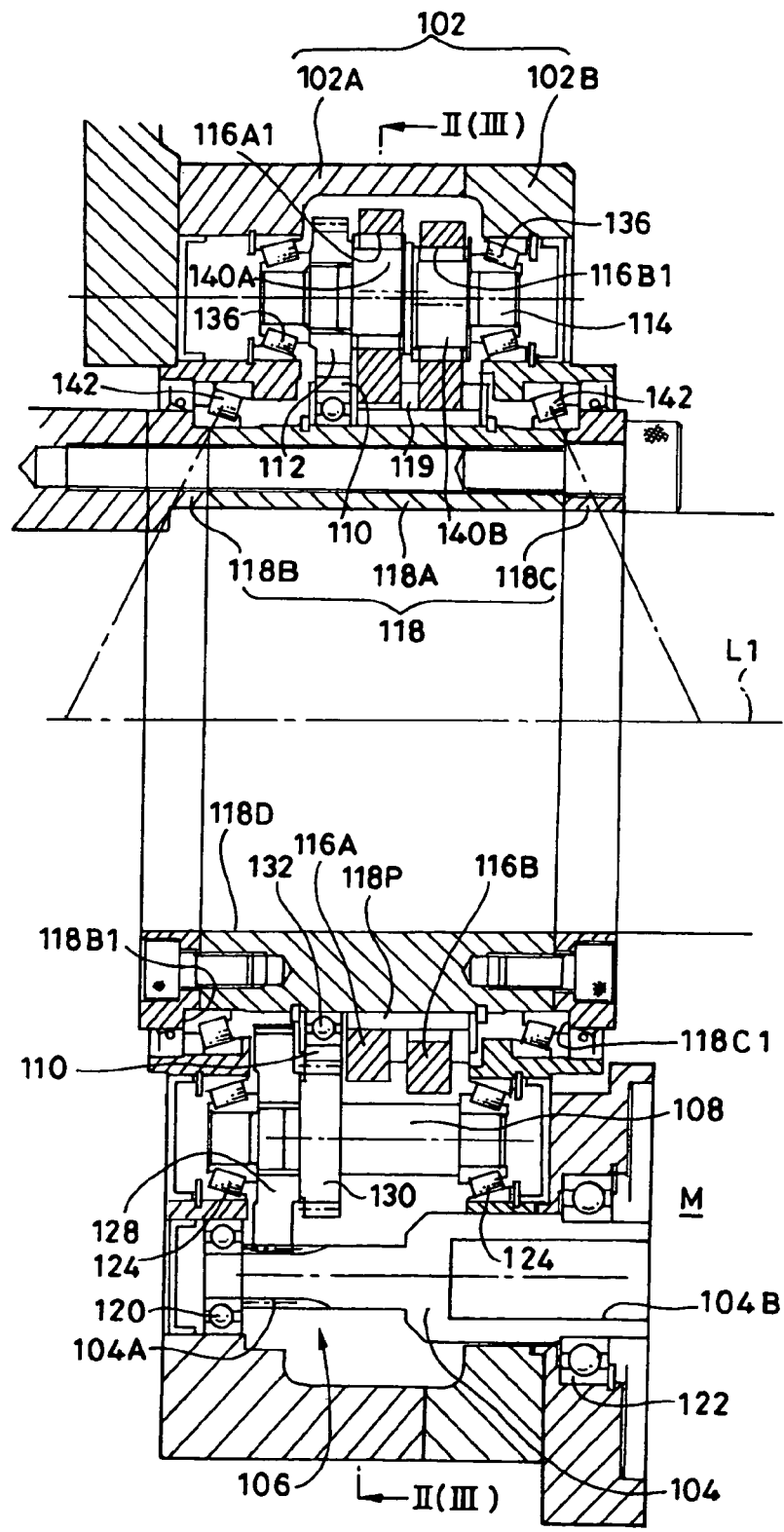
FIG. 1 is a lateral cross-sectional view of an internal teeth oscillating inner gearing planetary gear system according to an embodiment of the present invention.
Figure 2:
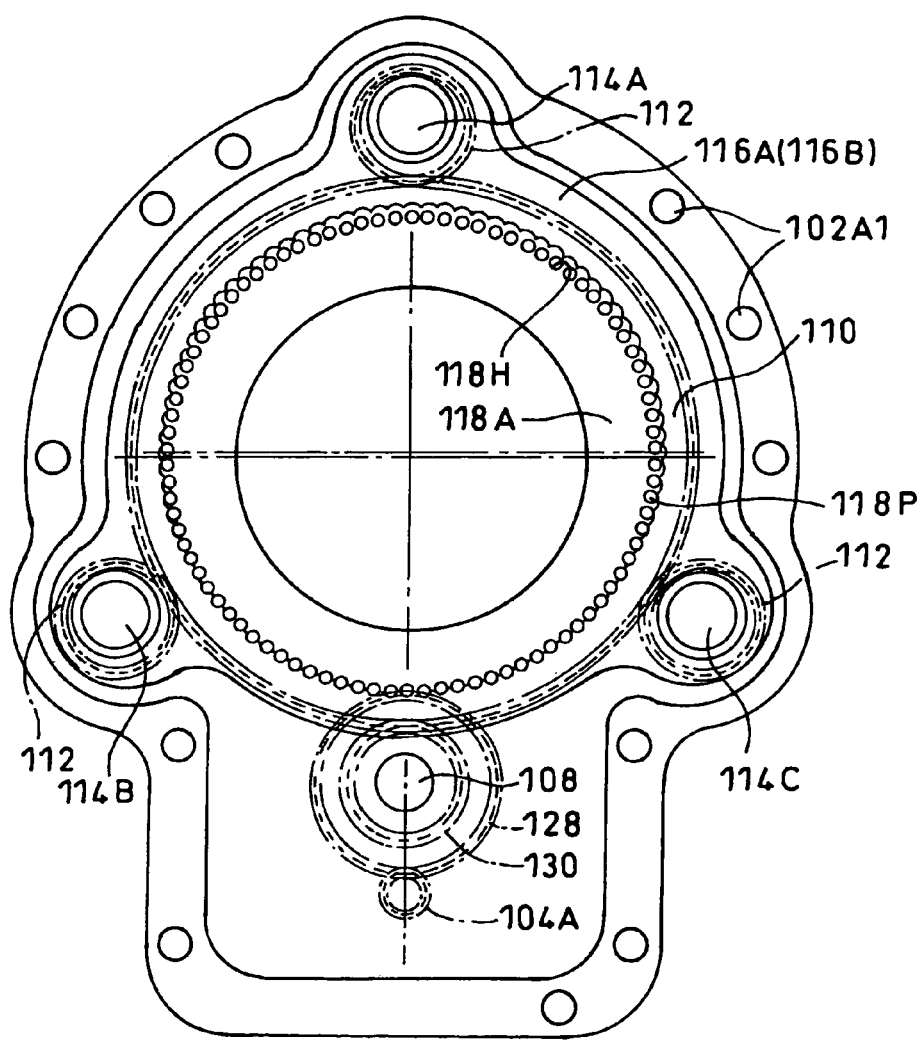
FIG. 2 is a cross-sectional view taken along the line II—II in FIG. 1.

FIGS. 1 and 2 show an internal teeth oscillating inner gearing planetary gear system (hereafter, simply gear system) 100 according to one embodiment of the present invention. FIG. 1 is a side cross-sectional view of the gear system 100, and FIG. 2 is a cross-sectional view taken along the line II—II in FIG. 1.

The gear system 100 mainly comprises a main body casing 102, an input shaft 104, a parallel shaft gear set 106, a middle shaft 108, a transmitting external gear 110, eccentric shaft driving gears (eccentric shaft gears) 112, three eccentric shafts 114 (114A through 114C) driven by the eccentric shaft driving gears 112, two internal teeth oscillating bodies (internal gears) 116A and 116B, and an external gear 118 which also functions as an output shaft.

That is, the gear system 100 comprises the plurality of (three in the embodiment) eccentric shafts 114 passing through the internal teeth oscillating bodies 116A and 116B for oscillatingly rotating the internal teeth oscillating bodies 116A and 116B, and by distributing and transmitting rotation of the input shaft 104 to the eccentric shafts 114A through 114C, all of the eccentric shafts 114A through 114C are rotated in phase.

Differing greatly from the previously discussed example of the prior art is the power transmission structure from the input shaft 104 to the eccentric shafts 114A through 114C and the casing structure of the entire gear system. These points will now be discussed.

The main body casing 102 comprises a first casing 102A and a second casing 102B located on the left and right respectively in FIG. 1. As shown in FIG. 2, a plurality of bolt holes 102A1 is each formed in the first casing 102A and the second casing 102B so as to pass therethrough. The first casing 102A and the second casing 102B are configured to be mutually joinable by bolts (not shown).

In the main body casing 102, the input shaft 104 is located sideways in FIG. 1, that is, parallel with the external gear (output shaft) 118, and is supported to be freely rotatable by bearings 120 and 122. A pinion 104A is formed at the end of the input shaft 104 (left in drawing). An insertion opening 104B is formed at another end thereof in which an output shaft of a motor M (omitted in drawing) is inserted.

Also in the main body casing 102, besides the input shaft 104, the middle shaft 108 is located in parallel with the external gear (output shaft) 118 at a position more radially outward than the internal teeth oscillating bodies 116A and 116B. The middle shaft 108 is supported to be freely rotatable by taper roller bearings 124, 124. A gear 128 is incorporated on the middle shaft 108 and meshes with the pinion 104A to form the parallel shaft gear set 106. Further, a middle pinion (a driving source-end pinion in this embodiment) 130 is incorporated thereon.

The ring-shaped transmitting external gear 110 is located at the outer circumference of the external gear (output shaft) 118 and coaxially with the external gear 118 through a bearing 132. The middle pinion 130 as well as the eccentric shaft driving gears 112 incorporated on each of the three eccentric shafts 114A through 114C concurrently mesh with the transmitting external gear 110. That is, the transmitting external gear 110 is linked to the middle shaft 108 via the middle pinion 130, and is also linked to each of all three of the eccentric shafts 114A through 114C via the eccentric shaft driving gears 112.

The eccentric shafts 114A through 114C are located at equal intervals on the same circumference (FIG. 2), each being supported at both ends by taper roller bearings 136, 136. Each of the eccentric shafts 114A through 114C axially passes through eccentric holes 116A1 and 116B1 of the internal teeth oscillating bodies 116A and 116B. Eccentric bodies 140A and 140B are integrally incorporated on each of the eccentric shafts 114A through 114C. The phases of the eccentric bodies 140A and 140B of each of the eccentric shafts 114A through 114C are arranged so that the three eccentric shafts 114 can rotate in phase at the same time in the same direction. Also, the two internal teeth oscillating bodies 116A and 116B are oscillatingly rotatable while each maintains a mutual 180° phase difference by sliding with the eccentric bodies 140A and 140B. Further, the reference number 119 in the drawings designates an insert ring for regulating axial movement of the two internal teeth oscillating bodies 116A and 116B.

The external gear 118 also functioning as a hollow-shaft type output shaft internally meshes with the internal teeth oscillating bodies 116A and 116B. The external gear 118 is made up from a substantially tubular member having a through-hole 118D through which piping, wiring, etc. are passable. The external gear is supported to be freely rotatable by the main body casing 102 through taper roller bearings 142, 142.

External teeth of the external gear 118 are configured by external pins 118P incorporated to be freely rotatable in grooves 118H. The number of the external pins 118P (number of external teeth) is 90, being less than the number of teeth (92) of the internal teeth of the internal teeth oscillating bodies 116A and 116B by two (slight difference in the number of teeth). The external gear 118 is made up of three members, including a main body 118A, and end members 118B and 118C. This enables incorporation and axial positioning of the taper roller bearings 142, 142 by step portions 118B1 and 118C1 respectively of the end portions 118B and 118C.

Operation of the gear system 100 will next be discussed.

Upon rotation of the input shaft 104 due to rotation of a motor shaft (not shown) of the motor M, the rotation undergoes a first-stage reduction via the pinion 104A and the gear 128, and is transmitted to the middle shaft 108. When the middle shaft 108 is rotated, the middle pinion 130 incorporated with the middle shaft 108 rotates, so that the transmitting external gear 110 meshing therewith rotates.

Since the eccentric shaft driving gears 112 are in mesh concurrently with the transmitting external gear 110, the gears 112 rotate due to rotation of the transmitting external gear 110. As a result, the three eccentric shafts 114A through 114C rotate in phase, thus, the two internal teeth oscillating bodies 116A and 116B oscillatingly rotate around the external gear 118 in a state of maintaining their respective phases at 180°. Since rotation of the internal teeth oscillating bodies 116A and 116B is restricted, a phase of the external gear 118 meshing with the internal teeth oscillating bodies 116A and 116B is shifted by the difference in the number of teeth through one rotation of oscillating rotation of the internal teeth oscillating bodies 116A and 116B. A rotation component equivalent to the phase difference makes rotation of the external gear 110, and output is delivered to outside. The eccentric shafts 114 are located circumferentially at equal intervals, and moreover, all the eccentric shafts 114 are driven, so that the internal gears 116A and 116B can be oscillated extremely smoothly.

According to the gear system 100 in accordance with the embodiment of the present invention, the middle shaft 108 is located in parallel with the external gear (output shaft) 118 at a position more radially outward than the internal teeth oscillating bodies 116A and 116B. Furthermore, the rotation of the input shaft 104 is inputted to the oscillating bodies after having been received by the middle shaft 108. Therefore, the input shaft 104 can be located at a position removed radially outward, instead of on the axis L1 of the gear system 100 as with the prior art. As a result, the axial length of an entire system can be shortened.

Further, since neither an input shaft nor a driving source exist on the axial side of the gear system 100, the external gear 118 can be designed as a large diameter hollow shaft passing through the gear system 100. The external gear 118 serves as an output shaft, and rotation thereof is extremely slow. Therefore, wire harnesses, cooling water piping, etc., can be directly located within the external gear 118 without needing to add separate protective piping or other similar features therein.

A structure was employed for the input shaft 104 having the insertion opening 104B for a motor shaft according to the discussed embodiment, however, a structure may be adopted wherein a pinion is formed directly on the end of a motor shaft of a motor to serve as an input shaft.

Also, the parallel shaft gear set 106 formed from the pinion 104A and the gear 128 may be omitted, making the pinion 104A of the input shaft 104 mesh directly with the middle pinion 130. Further, the middle shaft 108 may be omitted as well, attaching a somewhat larger pinion to the input shaft 104, to have this (as a driving source-end pinion) mesh directly with the transmitting external gear 110.

Figure 3:
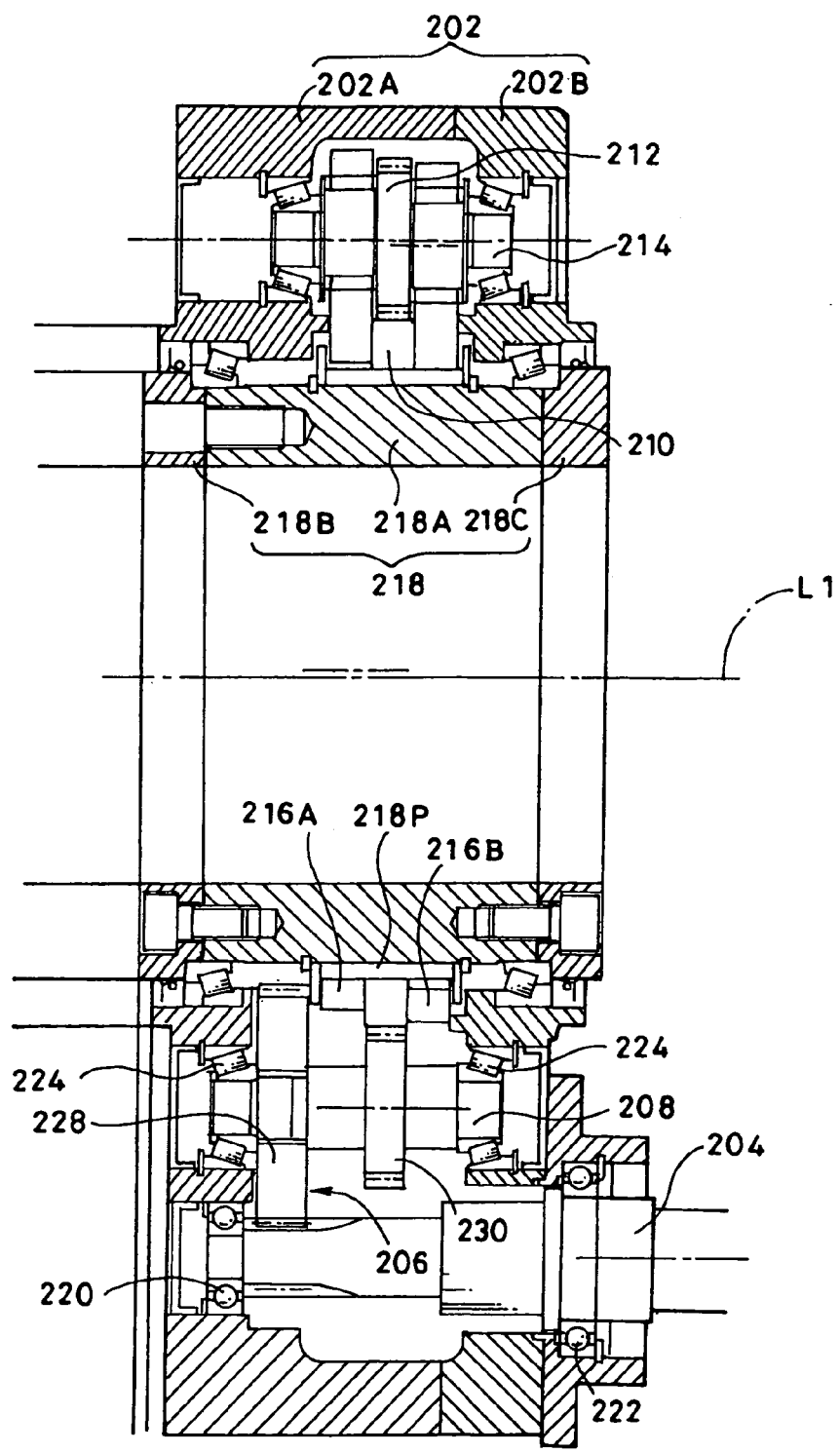
FIG. 3 is a cross-sectional view showing another embodiment of the present invention, corresponding to FIG. 2.
Figure 4:
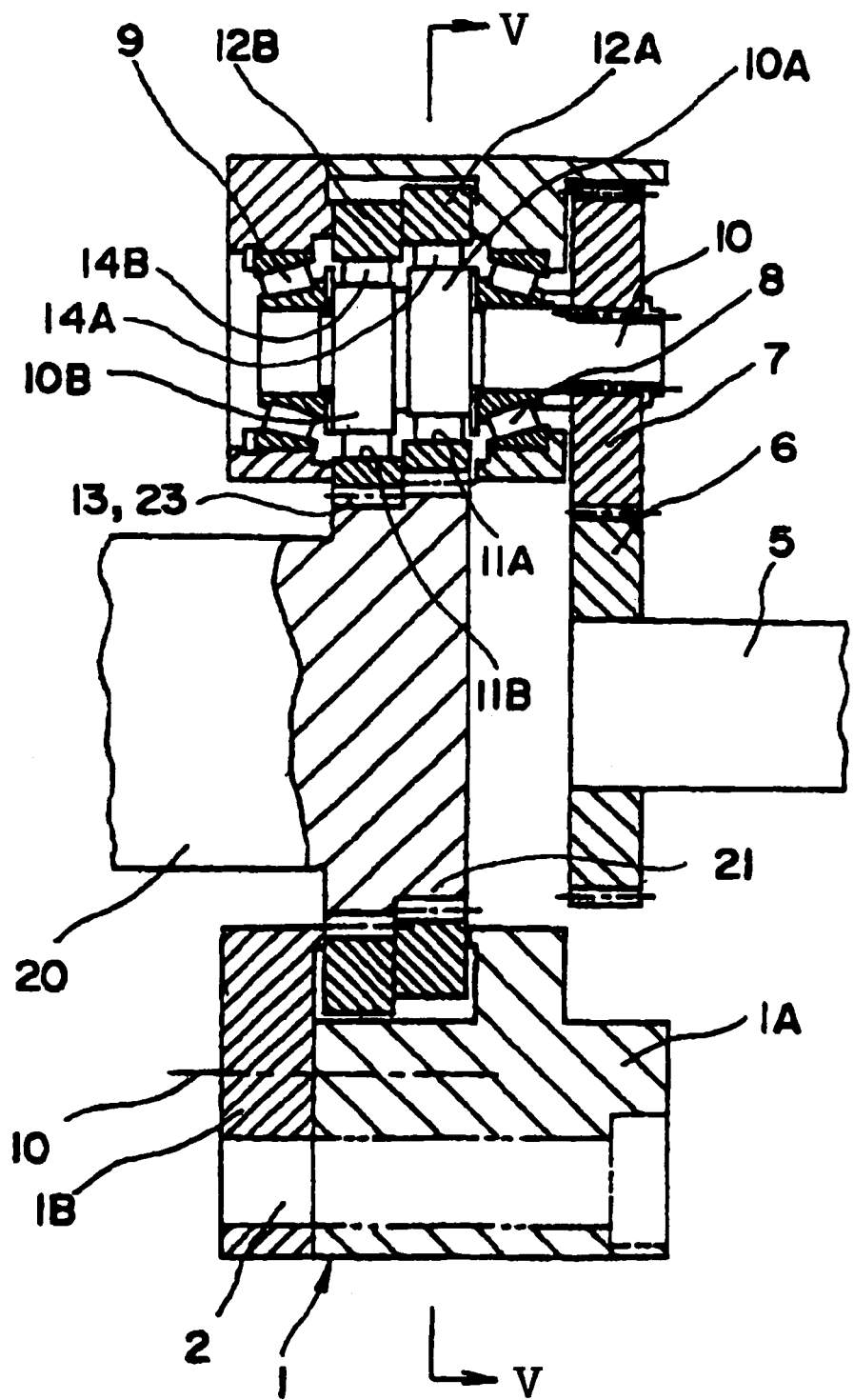
FIG. 4 is a lateral cross-sectional view of an internal teeth oscillating inner gearing planetary gear system according to a prior art.
Figure 5:
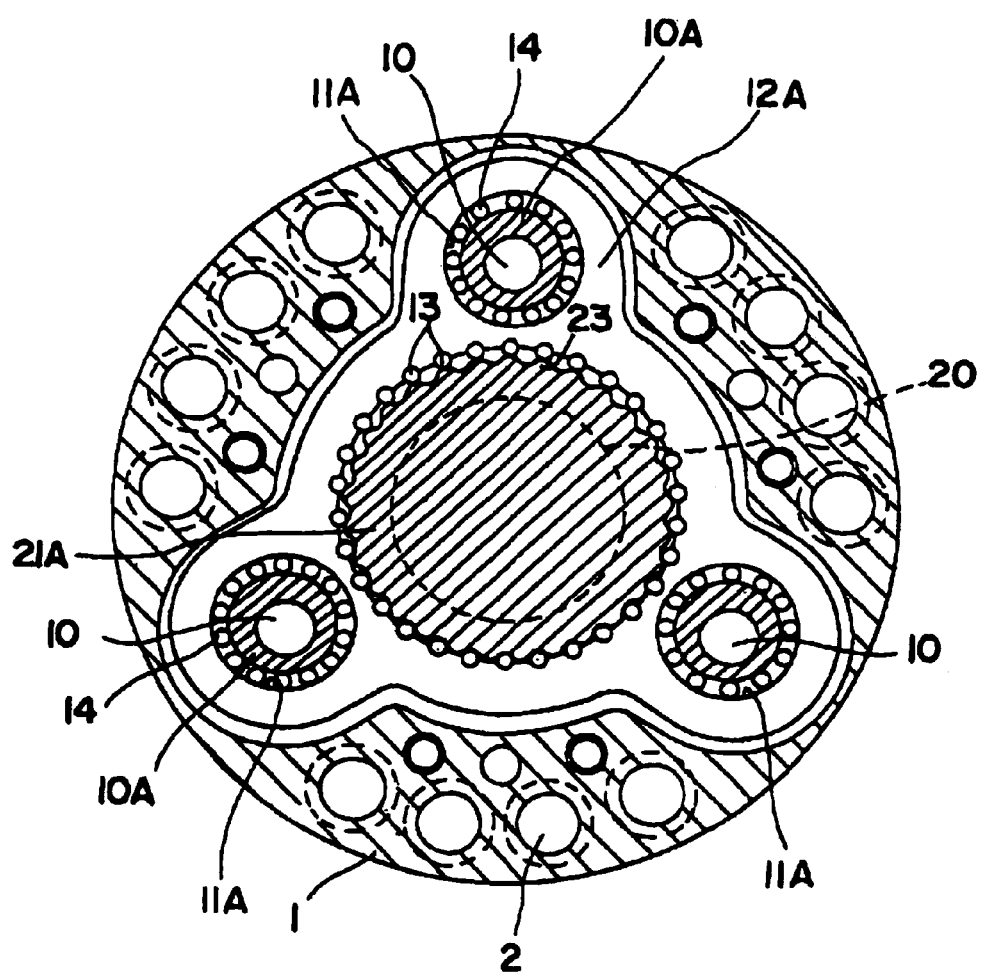
FIG. 5 is a cross-sectional view taken along the line V—V in FIG. 4.
Figure 6:
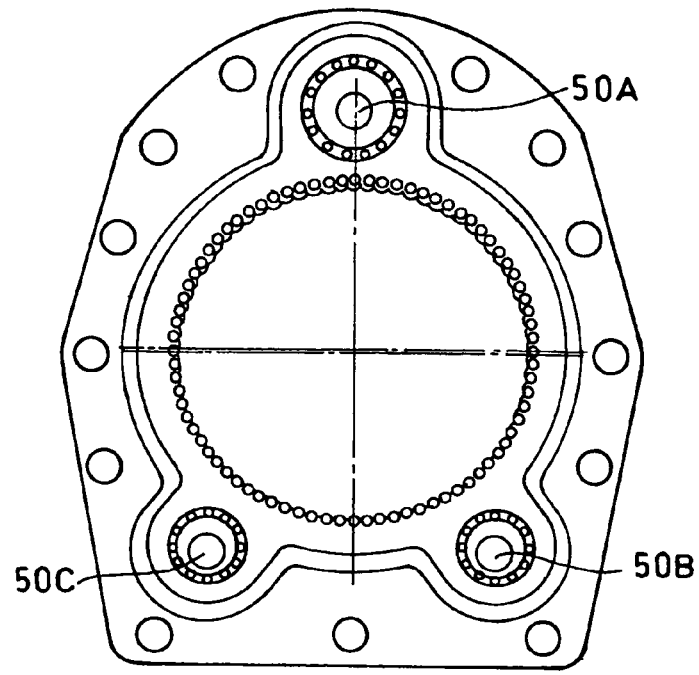
FIG. 6 is a lateral cross-sectional view of another internal teeth oscillating inner gearing planetary gear system according to a prior art.
Figure 7:
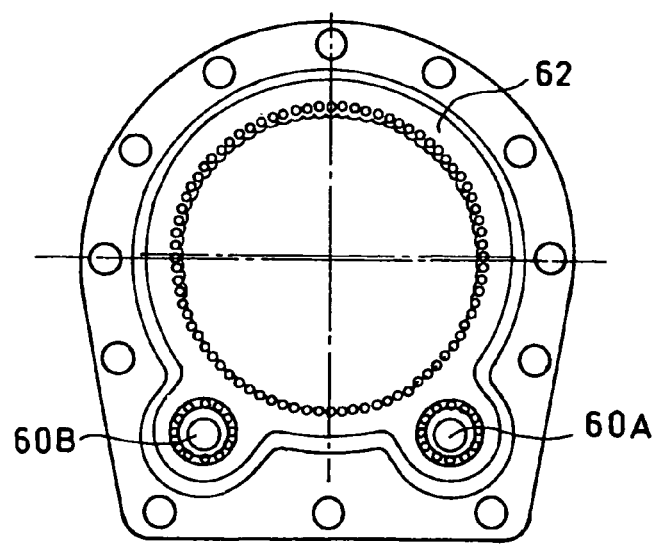
FIG. 7 is a cross-sectional view of still another internal teeth oscillating inner gearing planetary gear system according to a prior art.

Also according to the discussed embodiment, the transmitting external gear 110 is supported by the external gear 118 through the single-purpose bearing 132. As an alternative structure, however, as shown in FIG. 3 for example, a transmitting external gear 210 may be disposed between two internal teeth oscillating bodies 216A and 216B. The transmitting external gear 210 then can be made to serve as the insert ring 119 (FIG. 1) for regulating axial movement of the two internal teeth oscillating bodies 216A and 216B. Also with this arrangement, the single-purpose bearing 132 (FIG. 1) for supporting the transmitting external gear 210 around the outer circumference of the external gear 218 can be rendered unnecessary, since external pins 218P of an external gear 218 can function as rollers for supporting the transmitting external gear 210. Although, when this structure is not employed, for example, the internal teeth of the internal teeth oscillating bodies may have a circular tooth profile while the external teeth of the external gear have a trochoid tooth profile, and further, each may have an involute tooth profile, etc.

Since other structures of this embodiment are substantially the same as the previous embodiment, repeated explanation will be omitted. In the drawing, corresponding portions are designated by corresponding reference numbers each having same last two digits.

According to the discussed embodiments, the input shafts 104, 204 are located in parallel with respect to the axis L1 of the external gears (output shafts) 118, 218, however, the present invention is not limited in this manner. A structure may be adopted wherein the input shaft is located at a right angle with respect to the axis of the eccentric gears to add an orthogonal gear mechanism. In this instance, a driving device such as a motor which drives the gear system may be disposed radially to the gear system so that even less space can be occupied, particularly in the axial direction.

According to the present invention, an internal teeth oscillating inner gearing planetary gear system can be provided wherein installation space for piping, wiring, etc. can be easily secured in the central portion of the system according to a particular application and wherein further smoothness of power transmission can be achieved. The disclosure of Japanese Patent Application No. 2003-90065 filed Mar. 28, 2003 including specification, drawings and claims is incorporated herein by reference in its entirety.

What is claimed is:

1. An internal teeth oscillating inner gearing planetary gear system, comprising:
    a driving source-end pinion;
    an external gear;
    an internal gear having a slight difference in the number of teeth with the external gear;
    a plurality of eccentric shafts oscillatingly rotating the internal gear;
    eccentric shaft gears incorporated on the plurality of eccentric shafts, respectively; and
    a transmitting external gear meshing concurrently with the eccentric shaft gears and the driving source-end pinion.

2. The internal teeth oscillating inner gearing planetary gear system according to claim 1, further comprising
    a middle shaft, on which the driving source-end pinion is incorporated, provided in parallel to an output shaft at a position radially outward of the internal gear.

3. The internal teeth oscillating inner gearing planetary gear system according to claim 1, wherein
    a pinion incorporated on an input shaft directly meshes with the transmitting external gear as the driving source-end pinion.

4. The internal teeth oscillating inner gearing planetary gear system according to claim 1, wherein
    the internal gears are incorporated in a number of two or more axially, and the transmitting external gear is located between any two internal gears thereof.

5. The internal teeth oscillating inner gearing planetary gear system according to claim 1, wherein
    the plurality of eccentric shafts are located circumferentially at equal intervals.

6. The internal teeth oscillating inner gearing planetary gear system according to claim 1, wherein
    the transmitting external gear is formed in a ring shape, and is rotatably supported by an outer circumference of any one of the external gear and an output shaft.

7. The internal teeth oscillating inner gearing planetary gear system according to claim 6, wherein
    external teeth of the external gear are formed by external pins inserted to be freely rotatable in circular grooves thereof, and the external pins are configured to serve as rollers of bearings for the transmitting external gear.

8. A driving method of an internal teeth oscillating inner gearing planetary gear system including an internal gear and an external gear, comprising the steps of:
    driving a transmitting external gear by a driving source-end pinion and concurrently rotating a plurality of eccentric shaft gears meshing with the transmitting external gear, the eccentric shaft gears being incorporated on a plurality of eccentric shafts, respectively;
    concurrently rotating the eccentric shafts, on which the respective eccentric shaft gears are incorporated, by rotation of the plurality of eccentric shaft gears; and
    oscillatingly rotating the internal gear by the concurrent rotation of the plurality of eccentric shafts.

* * * * *

UNITED STATES PATENT AND TRADEMARK OFFICE
CERTIFICATE OF CORRECTION

PATENT NO. : 7,070,533 B2
APPLICATION NO. : 10/809713
DATED : July 20, 2006
INVENTOR(S) : Yo Tsurumi et al.

It is certified that error appears in the above-identified patent and that said Letters Patent is hereby corrected as shown below:

On the Title Page, in item (73), the name of the Assignee should read as follows:

Sumitomo Heavy Industries, Ltd., Tokyo (JP)

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

PATENT NO.         : 7,070,533 B2
APPLICATION NO. : 10/809713
DATED              : July 4, 2006
INVENTOR(S)        : Yo Tsurumi et al.

It is certified that error appears in the above-identified patent and that said Letters Patent is hereby corrected as shown below:

On the Title Page, in item (73), the name of the Assignee should read as follows:

Sumitomo Heavy Industries, Ltd., Tokyo (JP)

This certificate supersedes Certificate of Correction issued December 19, 2006.

Signed and Sealed this

Thirtieth Day of January, 2007

JON W. DUDAS
*Director of the United States Patent and Trademark Office*